United States Patent [19]
Ishida

[11] Patent Number: 5,308,089
[45] Date of Patent: May 3, 1994

[54] COMBINED OIL RING

[75] Inventor: Masao Ishida, Tokyo, Japan

[73] Assignee: Teikoku Piston Ring Co., Ltd., Tokyo, Japan

[21] Appl. No.: 919,862

[22] Filed: Jul. 27, 1992

[30] Foreign Application Priority Data

Aug. 9, 1991 [JP] Japan .................................. 3-225178

[51] Int. Cl.$^5$ ................................................ F16J 9/00
[52] U.S. Cl. ..................................... 277/139; 277/215; 277/235 A
[58] Field of Search ............ 277/139, 140, 215, 235 A

[56] References Cited

U.S. PATENT DOCUMENTS

| | | | |
|---|---|---|---|
| 2,297,112 | 9/1942 | Phillips | 277/215 |
| 2,579,698 | 12/1951 | Phillips | 277/139 |
| 2,713,527 | 7/1955 | Pien | 277/140 |
| 2,817,563 | 12/1957 | Marien | 277/140 |
| 3,131,944 | 5/1964 | Sanon | 277/139 |
| 3,323,807 | 6/1967 | Vanderbilt, Jr. | 277/140 |
| 3,606,355 | 9/1971 | Minegishi | 277/140 |
| 4,612,260 | 9/1986 | Kumaggi et al. | 277/235 A X |
| 5,154,433 | 10/1992 | Naruse | 277/235 A X |

FOREIGN PATENT DOCUMENTS

| | | | |
|---|---|---|---|
| 153516 | 2/1951 | Australia | 277/215 |
| 19971 | 12/1980 | European Pat. Off. | 277/215 |
| 1475713 | 9/1969 | Fed. Rep. of Germany | 277/140 |
| 2234285 | 2/1973 | Fed. Rep. of Germany | 277/215 |
| 53-147309 | of 1978 | Japan . | |
| 171049 | 10/1982 | Japan | 277/139 |
| 5456 | 1/1983 | Japan | 277/139 |
| 58-136771 | 4/1983 | Japan . | |
| 2134467 | 5/1990 | Japan | 277/235 A |
| 123352 | 2/1919 | United Kingdom | 277/215 |

Primary Examiner—William A. Cuchlinski, Jr.
Assistant Examiner—Scott W. Cummings
Attorney, Agent, or Firm—Frishauf, Holtz, Goodman & Woodward

[57] ABSTRACT

In a three-piece combined oil ring comprising a pair of side rails and provided between them a spacer expander, the side rails are each provided in the inner edge thereof with a plurality of cutouts at given intervals, thereby providing a combined oil ring improved in its conformable property to any deformation of a cylinder bore. A nitrided layer is formed by plasma nitriding on each side rail only at its outer edge face, thereby preventing embrittlement of the side rails and improving the durability.

4 Claims, 4 Drawing Sheets

PRIOR ART

COMBINED OIL RING

BACKGROUND OF THE INVENTION

1. Field of the Invention

This invention relates to a combined (or multi-piece) oil ring feasible for oil control, fitted to a piston of an internal combustion engine or compressor.

2. Description of the Prior Art

In recent years, internal combustion engines have increasingly higher performances, and those of a higher speed and a higher load have been developed. Accordingly, sliding members such as cylinders and piston rings are improved in variety so that they Can be improved in their heat resistance, wear resistance and seizure resistance. Nowadays, in addition to these properties, it is desirable to decrease fuel consumption and lubricating oil consumption. For this purpose, it has become popular, particularly in gasoline engines, to use three-piece combined oil rings.

Three-piece combined oil rings are comprised of upper and lower two side rails and a spacer expander provided between them, and have the following advantages: The upper and lower rails are set separate, and hence they can readily follow any minute deformation of a cylinder bore. The upper and lower rails come into contact with both the top wall and the bottom wall of an oil ring groove, and hence they can promise an excellent sealing effect. The upper and lower rails can be assembled in such a way that their gaps (rail-end gaps) can be set aside each other by 180°, and hence the rings by no means open at their gaps. As a result, the lubricating oil consumption can be decreased.

FIG. 9 illustrates an example of combined oil ring of this type. This combined oil ring 11 is comprised of upper and lower circular side rails 13 and 15 and a spacer expander 17 U-shaped in its cross section and fitted between the side rails 13 and 15 in a compressed stated. The spacer expander 17 is provided with cutouts 19 so formed as to play a role of guides through which oil is led to the oil ring groove.

It is prevailing that the side rails 13 and 15 have rigid layers 21 formed on their whole or some surfaces. For example, Japanese Laid-open Patent Application No. 58-136771 discloses that side rails are provided with nitrided layers on their whole surfaces. Japanese Laid-open Utility Model Application No. 53-147309 discloses that side rails are provided with hardened layers formed on their inner and outer edge faces by hardening or nitriding.

The above conventional combined oil rings, however, have the following problems remaining unsolved.

In the first place, although the combined oil rings having upper and lower rails separately provided are advantageous in that they can readily follow any minute deformation of a cylinder bore, they often can not exhibit a satisfactory conformable property in engines comprised of a cylinder block in which a plurality of cylinders are integrally formed, because such engines have particularly a high temperature at the part between combustion chambers to cause a non-uniformity in temperature distribution, resulting in a loss of roundness of the cylinder bore because of a difference in thermal expansion.

Secondly, in the case where the whole surfaces of side rails are treated by nitriding as disclosed in Japanese Laid-open Patent Application No. 58-136771, there remain the problems that the side rails tend to embrittle to cause cracks and that the oil ring groove tends to be worn because of contact of the side rails with the piston oil ring groove.

Thirdly, in the case where the inner and outer edge faces are treated by nitriding as disclosed in Japanese Laid-open Utility Model Application No. 53-147309, the problem of embrittlement can be lessened compared with the case where the whole surfaces are treated by nitriding, but, because of the inner edge face made rigid, the problem of the wear of oil ring groove has not been settled. That is, inner edge faces of side rails and inside corners thereof at the gaps tend to come in touch with the top and bottom walls of the oil ring groove, so that the oil ring groove may be abraded.

SUMMARY OF THE INVENTION

Accordingly, an object of the present invention is to provide a combined oil ring having been much improved in the conformable property of side rails to the deformation of a cylinder bore.

Another object of the present invention is to provide a combined oil ring that can be free from embrittlement of its side rails, can enjoy an improved wear resistance and can also prevent wear of the oil ring groove.

To achieve the above object, the present invention provides a three-piece combined oil ring comprising a pair of side rails and provided between them a spacer expander, wherein said side rails are each provided in the inner edge thereof with a plurality of cutouts at given intervals.

As another embodiment, the present invention also provides a three-piece combined oil ring comprising a pair of side rails and provided between them a spacer expander, wherein said side rails are each provided in the inner edge thereof with a plurality of cutouts at given intervals, and a nitrided layer is formed by plasma nitriding (or ionitriding) on each of said side rails only at its outer edge face.

In the combined oil ring of the present invention, the side rails are provided in their inner edges with a plurality of cutouts at given intervals. Hence the side rails can have a higher flexibility and can exhibit an improved conformable property to any minute deformation of a cylinder bore. As a result, lubricating oil consumption can be decreased.

In the case where nitrided layers are formed by plasma nitriding only on the outer edge faces of side rails, the embrittlement of the side rails can be lessened compared with the case where the whole surfaces of side rails are treated by nitriding, and the wear resistance can be improved at their surfaces coming into contact with the cylinder inner wall at which the side rails undergo most vigorous sliding friction, so that the oil ring can have an improved durability.

Moreover, in the case where nitrided layers are formed only on the outer edge faces of side rails, no nitriding is applied to the side rails' top and under surfaces coming into contact with the inner wall of the oil ring groove and to the rail ends at the gap thereof, and hence the oil ring groove can also be prevented from its wear.

Furthermore, in the case where nitrided layers are formed only on the outer edge faces of side rails, the cutouts can be readily formed in the inner edges of the side rails. If the whole side rails are treated by nitriding, it becomes difficult to form the cutouts in their inner edges.

DESCRIPTION OF THE PREFERRED EMBODIMENTS

Figure 1:
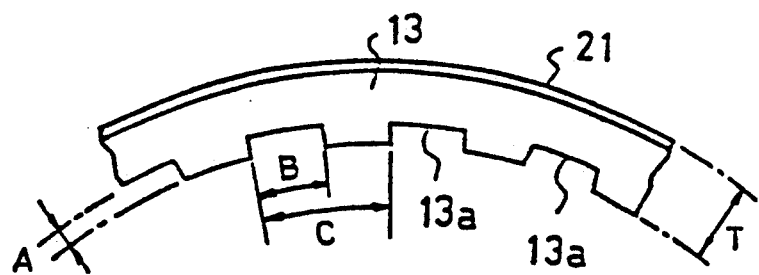
FIG. 1 is a partial enlarged plan view to illustrate an example of the combined oil ring of the present invention.

The present invention will be described below in detail by giving preferred embodiments.

In the present invention, the side rails are provided in their inner edges with cutouts at given intervals. The cutouts contribute an increase in the flexibility of the side rails to improve their conformable property to the minute deformation of a cylinder bore. The cutouts may have any shapes such as fans, triangles and circular arcs. There are no particular limitations on the pitch and size of the cutouts. The cutouts may preferably be formed in a cutout pitch of from 2 to 4 mm, a cutout width of from 1 to 2 mm and a cutout depth of from 0.3 to 0.5 mm. If the cutout pitch is larger than and the cutout width and cutout depth are smaller than the above lower limits, the effect of increasing the flexibility can not be well obtained. If the cutout pitch is smaller than and the cutout width and cutout depth are larger than the above upper limits, there is a possibility of a decrease in rigidity of the side rails.

In a preferred embodiment of the present invention, the side rails are treated by plasma nitriding only on their outer edge faces to form nitrided layers. The plasma nitriding is a method of carrying out nitriding or soft nitriding by causing glow discharge in a low vacuum, using nitrogen gas alone or a mixed gas of nitrogen gas and a small amount of hydrocarbon gas. Stated more specifically, a furnace is evacuated to a pressure of, e.g., about from $10^{-2}$ to $10^{-3}$ Torr. Thereafter a mixed gas of nitrogen and hydrogen is fed into the furnace, and the pressure in the furnace is controlled to from 1 to 10 Torr according to treatment conditions. In this furnace, using its body as the anode and a target article as the cathode, glow discharge is caused between the both. Then, ionized nitrogen is accelerated and made to collide against the target article, thereby nitriding the surface of the target article. In the present invention, employment of the plasma nitriding enables efficient application of nitriding only to the outer edge faces of the side rails, for example, in the manner as described in Examples set out later.

This plasma nitriding is advantageous in that (i) a thick nitrided layer can be obtained by treatment for a short time, (ii) the treatment can be carried out at a low temperature, (iii) no nitrogen-rich, brittle compound layer is produced on the surface, (iv) the coefficient of friction of the plasma nitrided layer can be smaller than that of other nitrided layer, (v) no pretreatment is required because of the action of sputtering of $H^+$ and $N^+$ ions, and (vi) the method is free from environmental pollution. In an instance in which a tempered martensite stainless steel is used as a material for the side rails, an $Fe_4N$ single layer can be formed as the nitrided layer, which can be a rigid layer with a high limit for fatigue strength and a superior durability.

In the present invention, there are no particular limitations on the thickness of the nitrided layer on the side rail outer edge face. The thickness may preferably be in the range of from 30 to 90 $\mu$m for the part having a hardness of Hv 700 or more from each outer edge face of the side rails. The outer edge faces of the side rails may each preferably have a hardness of from Hv 900 to 1,300.

In the present invention, nitriding may preferably be also applied to at least the part at which a spacer expander set between the upper and lower two side rails comes into contact with the inner edge faces of the side rails. The nitriding applied to the spacer expander is not limited to the plasma nitriding, and any known methods may be used, as exemplified by gas nitriding, salt bath soft nitriding and gas soft nitriding. Here, the nitriding may be applied only to the surface at which the spacer expander comes into contact with the above side rails, or may be applied to the whole surface of the spacer expander.

The side rails come into sliding contact with the cylinder inner wall, and hence may preferably be made of a material having good thermal resistance and wear resistance. For example, it is preferable to use tempered martensite stainless steel containing from 13% to 22% of Cr. Use of this tempered martensite stainless steel brings about the advantage that $Fe_4N$ single layers can be formed as the nitrided layers, as previously stated. The spacer expander imparts an expansion force to the side rails, and hence may preferably be made of a material having not only a good thermal resistance and wear resistance but also a good spring action and toughness. For example, it is preferable to use austenite stainless steel.

Figure 2:
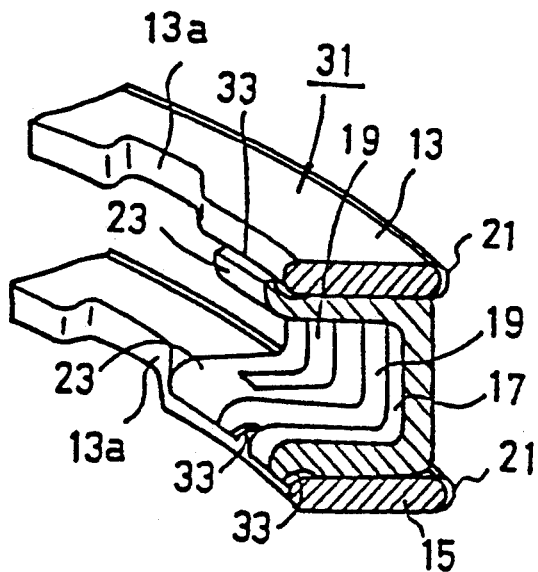
FIG. 2 is a perspective partially cutaway view to illustrate an example of the combined oil ring of the present invention.

FIG. 2 illustrate an embodiment of the combined oil ring of the present invention.

This combined oil ring, denoted as 31, is comprised of upper and lower, two ring-shaped side rails 13 and 15 formed of thin steel plates with a thickness of about 0.5 mm each, and a spacer expander 17 U-shaped in its cross section and fitted between the side rails 13 and 15 in a compressed stated.

In this embodiment, the side rails 13 and 15 are made of tempered martensite stainless steel containing from 13% to 22% of Cr. Nitriding is applied by plasma nitriding only to their outer edge faces, i.e., the parts coming into contact with the cylinder inner wall, and nitrided layers 21 are formed at that parts. Hence, they can be prevented from embrittlement and can be improved in their durability compared with the case where the nitriding is applied to the whole surfaces of the side rails.

The surfaces to which no nitriding is applied, i.e., the surfaces other than the outer edge faces of the side rails 13 and 15, may be optionally treated by forming triiron tetraoxide layers, parkerizing or tin coating so that they can have an adaptability.

In the present invention, cutouts 13a are formed in the inner edges of the side rails 13 and 15 as shown in FIG. 1. The cutouts 13a are formed in a given depth A, width B and pitch C. In this instance, the cutouts 13a may preferably be in a depth A of from 0.3 to 0.5 mm, a width B of from 1 to 2 mm and a pitch C of from 2 to 4 mm.

In the present embodiment, the spacer expander 17 is made of austenite Stainless steel and is provided with cutouts 19 at given intervals, so formed as to guide scraped lubricating oil to the oil ring groove. Tabs 23 are formed at the inner edges of the spacer expander 17. The tabs 23 are so formed as to be associated with the inner edges of the side rails 13 and 15. The shape of the spacer expander 17 is not limited to the U-shape as shown in the drawings, and may be other shape as in a corrugated spacer expander.

In this embodiment, nitriding is applied to the spacer expander 17 at its parts coming into contact with the side rails 13 and 15, in particular, at the above tabs. This prevents the spacer expander 17 from its wear caused by its contact with the side rails 13 and 15 made of a material having a higher hardness. The nitriding can be applied to the spacer expander by any methods such as gas nitriding, salt bath soft nitriding and gas soft nitriding. The nitriding may also be applied to the whole surface of the spacer expander 17.

Figure 3:
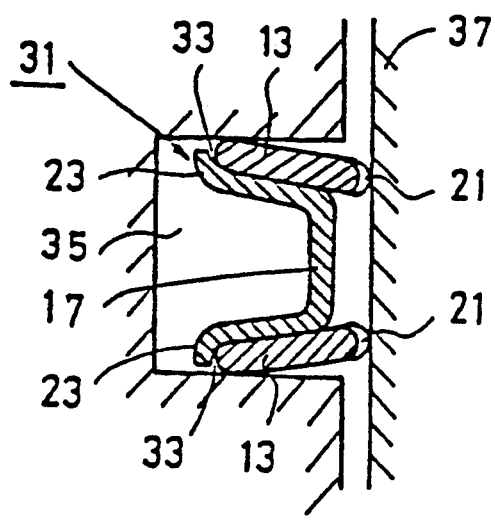
FIG. 3 is a cross section to illustrate the state in which the combined oil ring shown in FIG. 2 is fitted to the oil ring groove of a piston.

FIG. 3 illustrates the stat in which the combined oil ring shown in FIG. 2 is fitted to the oil ring groove of a piston.

The combined oil ring 31 fitted to the oil ring groove 35 of a piston is brought into pressure contact at its side-rail outer edge faces by the expansion force of the spacer expander 17, against the cylinder inner wall 37, where excess oil is scraped off. At this time, the side rails 13 and 15 can be prevented from being worn, because of the nitrided layers formed by plasma nitriding on their outer edge faces.

Meanwhile, the expansion force of the spacer expander 17 also acts in the direction where the side rails 13 and 15 are pressed upward and downward. Thus the top surface of the side rail 13 on its inner edge side and the under surface of the side rail 15 on its inner edge side are brought into pressure contact with the top of the inner wall of the oil ring groove 35 and the bottom of the inner wall of the oil ring groove 35, respectively. At this time, the inner wall of the oil ring groove 35 can be prevented from being worn, because of no formation of the nitrided layers at the parts except the outer edge faces of the side rails 13 and 15.

No nitrided layer is also formed on the rail end faces at the gap thereof, and hence the oil ring groove 35 can also be prevented from its wear that may be caused when the rail ends come in touch with the inner wall of the oil ring groove 35.

The nitrided layer 33 is also formed at the parts where the tabs 23 of the spacer expander 17 come into contact with the side rails 13 and 15, and hence the spacer expander 17 can be prevented from its wear caused by its contact with the side rails 13 and 15, making it possible to prevent the expansion force of the spacer expander from decreasing as a result of its wear.

EXPERIMENT 1

Figure 4:
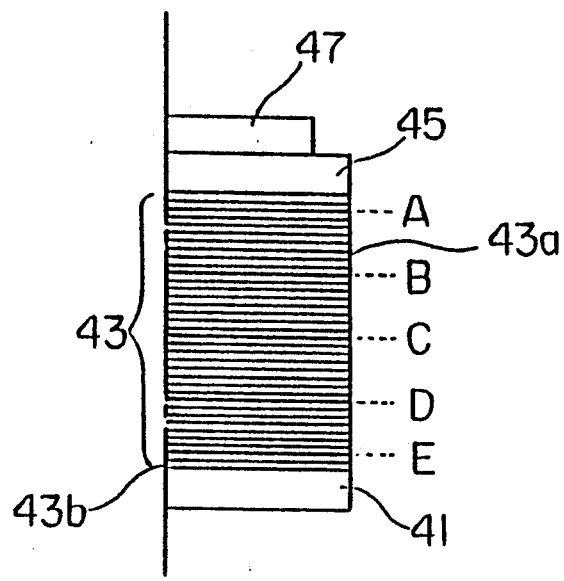
FIG. 4 illustrates how nitrided layers are formed by plasma nitriding only on the outer edge faces of side rails.

As shown in FIG. 4, which is a right-half side view along the center expressed by a chain line, a plurality of side rails 43 made of tempered martensite stainless steel were set in a pile around a cylinder 47 stood on a support plate 41, and a press plate 45 was put on the top of the pile so that the side rails 43 were longitudinally brought into close contact. In this state, plasma nitriding was applied to the side rails from the outside thereof to form nitrided layers.

Figure 5:
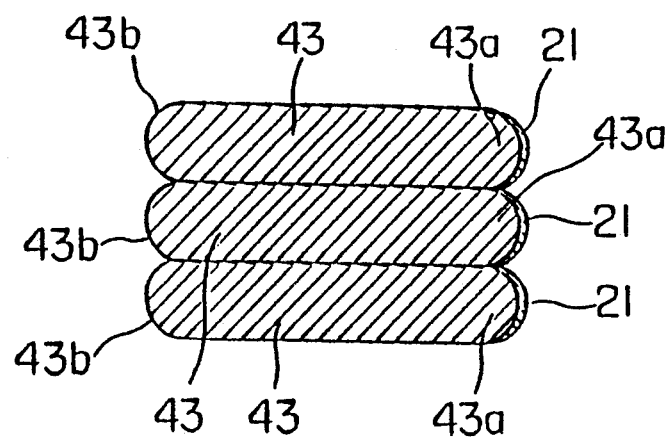
FIG. 5 is a partially enlarged cross section of the side rails to which the plasma nitriding has been applied in the manner as shown in FIG. 4.

FIG. 5 cross-sectionally illustrates side rails 43 having been treated by nitriding in this manner. Since the nitriding is applied in the state the side rails 43 are longitudinally brought into close contact, the top and under surfaces and inner edge face of the side rails 43 are not nitrided, and nitrided layers are formed only on the outer edge faces 43a of the side rails 43.

Figure 6:
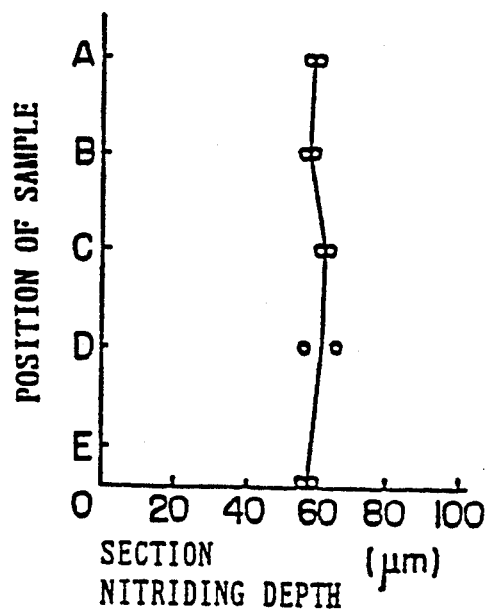
FIG. 6 illustrates the relationship between the depths of nitrided layers formed in the manner as shown in FIG. 4 and the positions at which the side rails are piled up.

FIG. 6 illustrates the relationship between the positions A to E at which the side rails 43 are piled up as shown in FIG. 4 and the thicknesses of nitrided layers formed at the respective positions. More specifically, samples are picked up from the spots A to E shown in FIG. 3 and the thicknesses of the nitrided layers 21 formed on the respective side rails 43 are measured.

As is seen from the results shown therein, the nitrided layers 21 formed on the outer edge faces 43a of the side rails 43 have a thickness of about 60 $\mu$m without regard to the positions of the samples, and all the nitrided layers 21 are formed in substantially uniform thickness with respect to the side rails 43.

Figure 7:
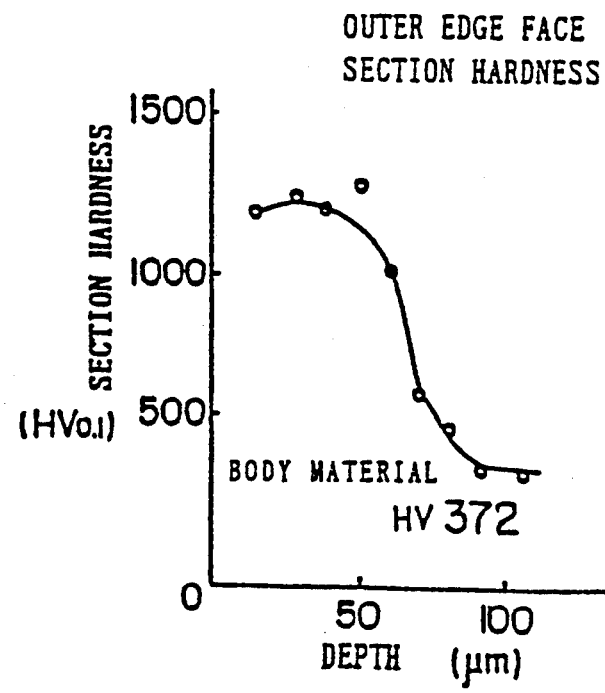
FIG. 7 illustrates the relationship between the depth from the outer edge face of a nitrided layer formed in the manner shown in FIG. 4 and the section hardness.

FIG. 7 illustrates the relationship between the depth from the outer edge periphery of a nitrided layer 21 formed on the outer edge face of a side rail 43 and the section hardness.

As is seen from the results shown therein, the body material of the side rail 43 has a hardness of Hv 372, while the nitrided layer 21 has a hardness of Hv 1,000 or more at a spot with a depth of about 60 $\mu$m from the outer edge periphery of the nitrided layer 21 when the nitrided layer is formed by plasma nitriding. Its hardness is very higher than in the case where no plasma nitriding is applied.

EXPERIMENT 2

Figure 8A:
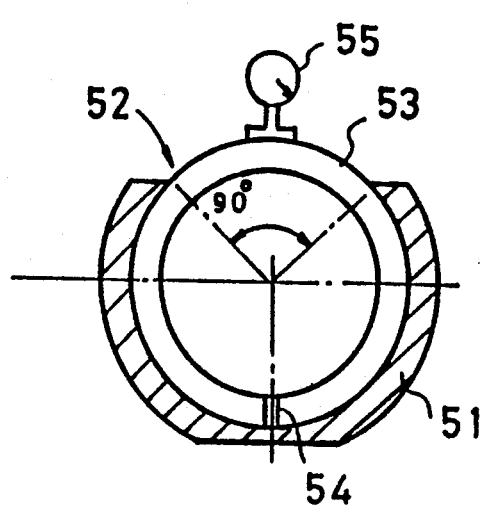
FIGS. 8A and 8B illustrate a test method by which the conformable property of side rails to a cylinder bore is evaluated.
Figure 8B:
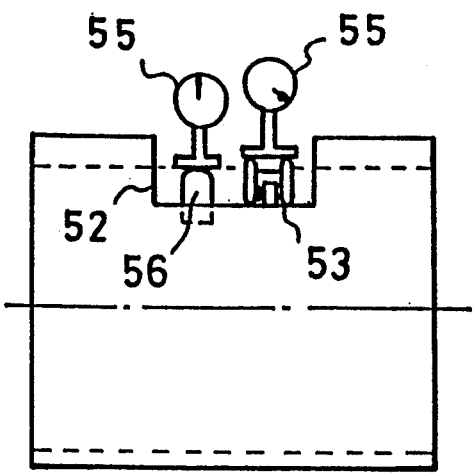
Figure 9:
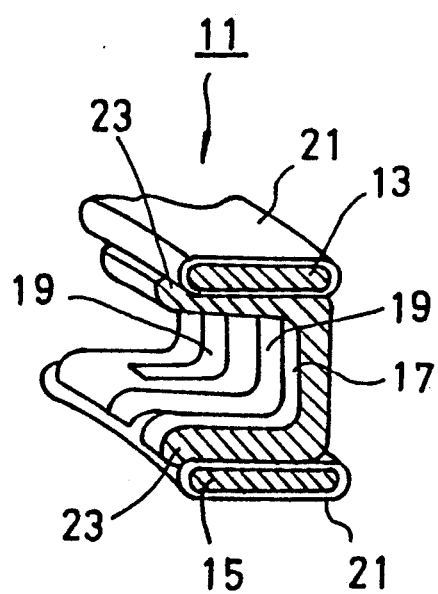
FIG. 9 is a perspective partially cutaway view to illustrate a conventional combined oil ring.

The conformable property of side rails to the cylinder bore (inner wall) was evaluated by the measuring method as illustrated in FIGS. 8A and 8B. More specifically, in FIG. 8A, reference numeral 51 denotes a cylinder, having an opening 52 cut away at an angle of 90°. Reference numeral 53 denotes a combined oil ring to be tested, which is fitted in the cylinder 51 with its gap downward. Reference numeral 55 denotes a dial gauge, which measures the protrusion of the oil ring from the opening 52. In FIG. 8B, reference numeral 56 denotes a compression ring, which is fitted to the cylinder 51. The protrusion of the oil ring 53 from the opening 52 is measured by reading how many millimeters it has protruded, regarding as a point zero (0) the protrusion of the compression ring 56 from the opening 52.

Combined oil rings respectively having various side rails as shown in FIG. 1 were produced. On the combined oil rings respectively having these side rails, the conformable property to the cylinder bore was evaluated by the method described above. Moment of inertia I of the cross section of each side rail was also measured, and values of $I_{NO1}/I$ were determined to make comparison with the value $I_{NO1}$ of Comparative Example 1 having no cutouts. Results obtained are shown in Table 1. In Table 1, the side rail width corresponds to the length T in FIG. 1.

TABLE 1

|  | Comparative Example 1 | Example 1 | Example 2 | Example 3 | Example 4 | Comparative Example 2 |
|---|---|---|---|---|---|---|
| Side rail width: (mm) | 2.32 | ← | ← | ← | ← | 2.12 |
| Side rail thickness: (mm) | 0.5 | ← | ← | ← | ← | ← |
| Cutout depth: (mm) | — | 0.3 | 0.5 | ← | ← | — |
| Cutout width: (mm) | — | 1 | ← | ← | 2 | — |
| Cutout pitch: (mm) | — | 2 | 4 | 2 | 4 | — |
| I*: | 0.52 | 0.34** | 0.25** | ← | ← | 0.40 |
| $I_{NO1}/I$: | 1.0 | 1.53 | 2.08 | 2.08 | 2.08 | 1.30 |
| Protrusion from cylinder opening: (mm) | 0.365 | 0.465 | 0.510 | 0.535 | 0.535 | 0.420 |

*Moment of inertia of the cross section
**Cutout portions

As is seen from the results shown in Table 1, Examples 1 to 4, provided with cutouts in the inner edges of the side rails, show a larger extent of protrusion from the opening 52 in FIGS. 8A and 8B than Comparative Examples 1 and 2, proving that the former can exhibit a superior conformable property to the cylinder bore. In Comparative Example 2, the side rail width is smaller than those in Examples 1 to 4. Nonetheless, Examples 1 to 4, provided with cutouts in the inner edges of the side rails, show a better conformable property to the cylinder bore.

As described above, the combined oil ring of the present invention comprises side rails each provided in the inner edge thereof with a plurality of cutouts at given intervals. Hence the side rails can have a higher flexibility and can exhibit an improved conformable property to any minute deformation of the cylinder bore. As a result, lubricating oil consumption can be more descreased. In the case where the nitrided layers are formed by plasma nitriding only on the outer edge faces of side rails, the embrittlement of the side rails can be prevented and also the durability can be improved. In addition, the wear of the oil ring groove can also be decreased. Thus, the present invention can provide a combined oil ring capable of maintaining a low lubricating-oil consumption over a long period of time.

As described above, the combined oil ring of the present invention comprises side rails each provided in the inner edge thereof with a plurality of cutouts at given intervals. Hence the side rails can have a higher flexibility and can exhibit an improved conformable property to any minute deformation of the cylinder bore. As a result, lubricating oil consumption can be more decreased. In the case where the nitrided layers are formed by plasma nitriding only on the outer edge faces of side rails' the embrittlement of the side rails can be prevented and also the durability can be improved. In addition, the wear of the oil ring groove can also be decreased. Thus, the present invention can provide a combined oil ring capable of maintaining a low lubricating-oil consumption over a long period of time.

What is claimed is:

1. In a three-piece combined oil ring comprising a pair of side rails and provided between them a spacer expander, the improvement wherein said side rails are each provided in the inner edge thereof with a plurality of cutouts at given intervals; and wherein said cutouts in the side rails are in a cutout pitch of from 2 to 4 mm, a cutout width of from 1 to 2 mm and a cutout depth of from 0.3 to 0.5 mm.

2. In a three-piece combined oil ring comprising a pair of side rails and provided between them a space expander, the improvement wherein said side rails are each provided in the inner edge thereof with a plurality of cutouts at given intervals, and a nitrided layer is formed by plasma nitriding on each of said side rails only at its outer edge face; and wherein said cutouts in the side rails are in a cutout pitch of from 2 to 4 mm, a cutout width of from 1 to 2 mm and a cutout depth of from 0.3 to 0.5 mm.

3. The combined oil ring according to claim 2, wherein a nitrided layer is formed on said spacer expander at least at its part coming into contact with the inner edge face of each of said side rails.

4. The combined oil ring according to claim 3, wherein said side rails are made of a tempered martensite stainless steel containing from 13% to 22% of Cr, and said spacer expander is made of an austenite stainless steel.

* * * * *